(12) United States Patent
Chan

(10) Patent No.: US 10,789,509 B2
(45) Date of Patent: Sep. 29, 2020

(54) SYSTEMS AND METHODS FOR GENERATING MACHINE LEARNING APPLICATIONS

(71) Applicant: WeR.AI, Inc., Colo de Caza, CA (US)

(72) Inventor: Man Chan, San Jose, CA (US)

(73) Assignee: WeR.AI, Inc., Rancho Santa Margarita, CA (US)

( * ) Notice: Subject to any disclaimer, the term of this patent is extended or adjusted under 35 U.S.C. 154(b) by 71 days.

(21) Appl. No.: 16/218,425

(22) Filed: Dec. 12, 2018

(65) Prior Publication Data

US 2019/0228261 A1     Jul. 25, 2019

Related U.S. Application Data

(60) Provisional application No. 62/621,505, filed on Jan. 24, 2018.

(51) Int. Cl.
*G06K 9/62* (2006.01)
*G06F 16/22* (2019.01)
*G06N 20/00* (2019.01)

(52) U.S. Cl.
CPC ......... *G06K 9/6253* (2013.01); *G06F 16/221* (2019.01); *G06K 9/6262* (2013.01); *G06N 20/00* (2019.01)

(58) Field of Classification Search
None
See application file for complete search history.

(56) References Cited

U.S. PATENT DOCUMENTS

| 9,672,355 B2 * | 6/2017 | Titonis ............... G06F 21/56 |
| 2016/0148115 A1 | 5/2016 | Sirosh |
| 2017/0178020 A1 | 6/2017 | Duggan |
| 2017/0185921 A1 | 6/2017 | Zhang |
| 2018/0067732 A1 * | 3/2018 | Seetharaman ...... G06F 16/2358 |
| 2019/0361697 A1 * | 11/2019 | Hu .................... G06F 11/362 |

OTHER PUBLICATIONS

International Application No. PCT/US2019/015006, Search Report and Written Opinion dated Aug. 1, 2019.

* cited by examiner

*Primary Examiner* — Alan Chen
(74) *Attorney, Agent, or Firm* — Ahmann Kloke LLP

(57) ABSTRACT

Systems and methods for generating prebuilt machine learning framework objects comprising sets of prebuilt machine learning components and one or more data mapping requirements. The components are associated with a respective machine learning service. One or more datasets are obtained. A user-specified context for creating a particular machine learning application is obtained. A particular prebuilt object is selected based on the datasets and the context. One more candidate data mappings are identified based on the data mapping requirements and the datasets. A particular data mapping is selected. A particular set of prebuilt components is selected from the plurality of prebuilt components. The particular machine learning application is generated from the particular prebuilt object based on the particular data mapping and the particular set of prebuilt components, the particular machine learning application comprising an executable application. The machine learning application is deployed.

30 Claims, 6 Drawing Sheets

SYSTEMS AND METHODS FOR GENERATING MACHINE LEARNING APPLICATIONS

CROSS-REFERENCE TO RELATED APPLICATIONS

The present application claims the benefit of U.S. Provisional Patent Application Ser. 62/621,505, filed Jan. 24, 2018 and entitled "Efficient Platform and Generalized Framework for Automating ML Solution Creation Using Prebuilt Components," which is hereby incorporated by reference herein.

TECHNICAL FIELD

This disclosure pertains to systems for generating applications (e.g., software applications and/or hardware applications). More specifically, this disclosure pertains to systems for generating machine learning applications.

BACKGROUND

Under conventional approaches, machine learning engineers may create and deploy particular machine learning applications to address particular problems. Typically, machine learning engineers need to create such applications from scratch for each particular problem. For example, machine learning engineers may need to code programs from scratch, and instruct a computing system to test many different permutations of data mappings to determine an appropriate data mapping for a particular machine learning application. This can require a lot of time and/or computational resources. For example, a traditional system may need to brute force many different computations to determine the appropriate data mapping for the particular machine learning application, which may be processor and/or memory intensive, and may not be scalable and/or otherwise efficiently modifiable.

SUMMARY

A claimed solution rooted in computer technology overcomes many of the problems encountered when developing machine learning applications. specifically arising in the realm of computer technology. In various embodiments, a computing system is configured to generate and/or provide reusable prebuilt objects and prebuilt components to rapidly and efficiently generate and deploy machine learning applications (e.g., recommendation systems). The prebuilt objects may each define a particular machine learning process and requirements for building a corresponding machine learning application based on a particular set of data and/or other requirements (e.g., machine learning model performance requirements). The level of detail may be initially low (e.g., specifying data input type requirements, but not specifying the particular data input identifiers), so that they may be reused to generate a variety of different machine learning applications. The prebuilt objects may also include and/or reference various prebuilt components associated with particular machine learning services (e.g., data onboarding, data preparation, feature generation, machine learning modeling, and/or model deployment) for implementing the machine learning process with the particular set of data and/or requirements. This may, for example, reduce computing resource requirements (e.g., processor and/or memory requirements) and allow the computing system and/or machine learning application to be more scalable and/or otherwise efficiently modifiable relative to traditional systems.

Various embodiments of the present disclosure include systems, methods, and non-transitory computer readable media configured to generate a plurality of prebuilt machine learning framework objects. Each of the prebuilt machine learning framework objects may comprises a plurality of sets of prebuilt machine learning components and one or more data mapping requirements. Each of the sets of prebuilt machine learning components may be associated with a respective machine learning service. One or more datasets may be obtained. A user-specified context for creating a particular machine learning application may be obtained. A particular prebuilt machine learning framework object may be selected from the plurality of machine learning framework objects based on the one or more datasets and the user-specified context for creating the particular machine learning application. One more candidate data mappings may be identified based on the data mapping requirements of the particular prebuilt machine learning framework object and the one or more datasets. A particular data mapping of the one or more candidate data mappings may be selected. A particular set of prebuilt machine learning components may be selected from the plurality of sets of prebuilt machine learning components of the particular prebuilt machine learning framework object. The particular machine learning application may be generated from the particular prebuilt machine learning framework object based on the particular data mapping and the particular set of prebuilt machine learning components. The particular machine learning application may comprise an executable application. The machine learning application may be deployed.

In some embodiments, the respective machine learning services include two or more of a data onboarding service, a data preparation service, a feature service, a model selection service, and a model deployment service.

In some embodiments, at least a portion of the one or more datasets comprise tabular data, the tabular data including at least one table comprising a plurality of rows and a plurality of columns.

In some embodiments, the systems, methods, and non-transitory computer readable media further configured to perform: mapping, for each of the candidate mappings, at least one table to a particular table of a respective candidate mapping of the plurality of candidate mappings; mapping, for each of the candidate mappings, at least two columns of the plurality of columns of the table to two or more particular columns of the one or more datasets; determining a respective score for each of the respective candidate mappings; selecting the particular data mapping of the one or more candidate data mappings based on the respective scores.

In some embodiments, the systems, methods, and non-transitory computer readable media further configured to perform: selecting at least two sets of prebuilt machine learning components from the plurality of sets of prebuilt machine learning components based on one or more implementation rules, the implementation rules indicating a particular platform associated with a system to execute the machine learning application; scoring each of the at least two sets of prebuilt machine learning components; selecting the particular set of prebuilt machine learning components based on the scoring.

In some embodiments, the systems, methods, and non-transitory computer readable media further configured to perform: selecting a plurality candidate machine learning framework objects from the plurality of machine learning framework objects based on the one or more datasets and the user-specified context for creating the particular machine learning application; and validating a particular prebuilt machine learning framework object of the plurality of candidate machine learning framework objects, the validated particular prebuilt machine learning framework object comprising the particular prebuilt machine learning framework object from the plurality of machine learning framework objects.

In some embodiments, validation further comprises instantiating at least one prebuilt machine learning component of the particular prebuilt machine learning framework object of the plurality of candidate machine learning framework objects; executing the instance of the least one prebuilt machine learning component of the particular prebuilt machine learning framework object of the plurality of candidate machine learning framework objects; comparing one or more results of the executing the instance of the least one prebuilt machine learning component of the particular prebuilt machine learning framework object of the plurality of candidate machine learning framework objects against one or more threshold conditions; determining, based on the comparing, the particular prebuilt machine learning framework object of the plurality of candidate machine learning framework objects is valid.

In some embodiments, the machine learning framework object is platform independent.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

A claimed solution rooted in computer technology overcomes problems specifically arising in the realm of computer technology. In various embodiments, a computing system is configured to generate and/or provide reusable prebuilt objects and prebuilt components to rapidly and efficiently generate and deploy machine learning applications (e.g., recommendation systems). The prebuilt objects may each define a particular machine learning process and requirements for building a corresponding machine learning application based on a particular set of data and/or other requirements (e.g., machine learning model performance requirements). The level of detail may be initially low (e.g., specifying data input type requirements, but not specifying the particular data input identifiers), so that they may be reused to generate a variety of different machine learning applications. The prebuilt objects may also include and/or reference various prebuilt components associated with particular machine learning services (e.g., data onboarding, data preparation, feature generation, machine learning modeling, and/or model deployment) for implementing the machine learning process with the particular set of data and/or requirements. This may, for example, reduce computing resource requirements (e.g., processor and/or memory requirements) and allow the computing system and/or machine learning application to be more scalable and/or otherwise efficiently modifiable relative to traditional systems.

Unlike traditional solutions, the computing system may generate machine learning applications within a short period of time (e.g., days or weeks), and deploy machine learning applications directly to a client system. For example, rather than custom programming a machine learning application from scratch, which may take months or years, the systems and methods described herein may generate the machine learning application from prebuilt objects and prebuilt components. This may facilitate rapid generation and deployment of machine learning applications, and also allow existing machine learning applications to be easily updated and/or extended (e.g., by adding, updating, and/or removing prebuilt components).

Figure 1:
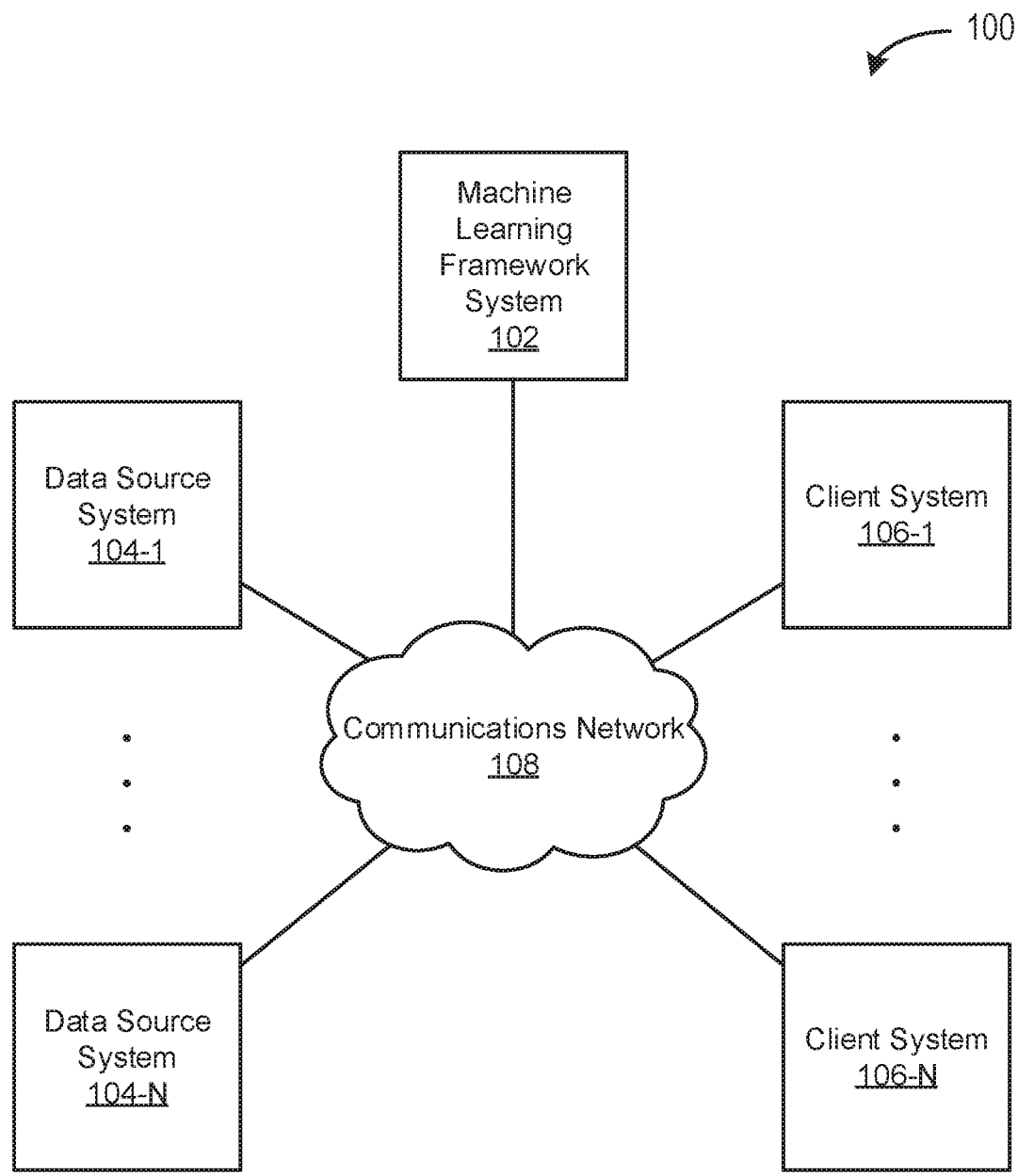
FIG. 1 depicts a diagram of an example system for generating machine learning applications according to some embodiments.

FIG. 1 depicts a diagram 100 of an example system for generating machine learning applications according to some embodiments. In the example of FIG. 1, the system includes a machine learning framework system 102, data source systems 104-1 to 104-N (individually, the data source system 104, collectively, the data source systems 104), client systems 106-1 to 106-N (individually, the client system 106, collectively, the client systems 106), and a communication network 108.

The machine learning framework system 102 may function to generate and/or store prebuilt machine learning framework objects (or, simply, "prebuilt objects"). In various embodiments, functionality of the machine learning framework system 102 may be performed by one or more servers (e.g., a cloud-based server, local server) and/or other computing devices. Prebuilt objects may define various attributes, functions, requirements and/or rules to assist in generating a machine learning application. As used herein, "define" or "include" may also refer to a reference (e.g., APIs, pointers, and/or the like). For example, a prebuilt object may include source code for a function (or a function definition from which source code may be generated), and/or it may include an API for that function. Requirements may include data mapping requirements for onboarding data for a machine learning process. For example, data mapping requirements may define particular data types, table and/or column information (e.g., table names or other identifiers and/or column names or other identifiers), and/or the like, for onboarding data and/or preparing data for a machine learning process.

In some embodiments, prebuilt objects may be coarsely defined (or, "underdefined") to facilitate reusability of the prebuilt objects for generating a variety of different machine learning applications. For example, the prebuilt objects may define required data input types, but not define the actual data input identifiers (e.g., table names and/or column names) themselves. In a more specific example, a prebuilt object may define a table with fields for data mapping, but the fields themselves are specifically not defined. The machine learning framework system 102 may determine the actual fields during the machine learning application generation process in order to generate a particular machine learning application.

In some embodiments, a prebuilt object may define prebuilt machine learning components (or, simply, "prebuilt components") for implementing a machine learning process and generating a corresponding machine learning application. For example, a prebuilt object may include sets of prebuilt components for respective services of a machine learning process. Services may include data onboarding services, data preparation services (e.g., extract, transform, load), feature generation services, model selection services, and/or model deployment services. The prebuilt components may facilitate rapid generation and/or deployment of machine learning applications. For example, rather than having to manually code each of programs associated with the services, the prebuilt objects may already include the prebuilt components for some or all of those services, and select particular prebuilt components as needed for a particular machine learning application. Like the prebuilt objects, the prebuilt components may be coarsely defined to facilitate reusability of the prebuilt components for generating a variety of different machine learning applications.

In some embodiments, the machine learning framework system 102 may function to select one or more prebuilt objects for creating a machine learning application. The machine learning framework system 102 may select prebuilt objects based on original data and/or a user-specified context. The machine learning framework system 102 may analyze original data and determine a format and/or content of the original data. For example, the content may include software compilation information relating to software deployment (e.g., pass/fail rates for various stages of a continuous integration deployment pipeline), and select one or more prebuilt objects for generating a recommendation system potentially capable of facilitating optimization of a software deployment system. In another example, a user-specified context may include a problem to be solved (e.g., how to optimize a software deployment pipeline), a technical environment for deployment of a machine learning application, such as a particular platform. As used herein, the term "platform" may refer to operating systems, programming languages, hardware devices, and/or the like. If multiple prebuilt objects may be appropriate (e.g., based on the original data and/or user-specified context), the machine learning framework system 102 may select all of the appropriate prebuilt objects, and test (or, validate), some or all of the prebuilt objects to determine a best fit.

In some embodiments, the machine learning framework system 102 may function to select one or more sets of prebuilt components defined by a prebuilt object for creating a machine learning application. For example, the machine learning framework system 102 may select a set of prebuilt components for one or more machine learning services. The machine learning framework system 102 may select prebuilt components based on original data and/or user-specified context (e.g., in a similar manner as prebuilt objects are selected). If multiple prebuilt components, or sets of prebuilt components, may be appropriate (e.g., based on the original data and/or user-specified context), the machine learning framework system 102 may select all of the appropriate prebuilt components, or sets of prebuilt components, and test (or, validate), some or all of the prebuilt components to determine a best fit.

In some embodiments, the machine learning framework system 102 may function to configure a prebuilt object and/or prebuilt components to generate a machine learning application. For example, the machine learning framework system 102 may modify the prebuilt components from their initial coarsely defined state, to a more granular state capable of being compiled and/or executed. For example, based on mapping table and/or column information of original data to table and/or column requirements of the prebuilt object, the system may more granularly define prebuilt components associated with an onboarding and/or data preparation service, and/or other machine learning services.

In some embodiments, the machine learning framework system 102 may function to generate an executable machine learning application. For example, the machine learning framework system 102 may create an executable including a selected model. In some embodiments, the machine learning framework system 102 may also function to deploy the machine learning application to a client system, and/or update a machine learning application (e.g., to adjust for drift after the machine learning application has been deployed, and/or extend or decrease functional capabilities of the machine learning application after it has been deployed).

In some embodiments, the machine learning framework system 102 may function to score, and/or otherwise evaluate, a machine learning application prior to deployment to a client system (e.g., to determine whether it satisfies user-specified performance requirements and/or prebuilt object-specified performance requirements). For example, the machine learning framework system 102 may score a deployed model associated with one or more of the selected prebuilt components, and/or it may score some or all of the individual stages prior to deployment of the selected model. For example, each stage (e.g., data onboarding, data preparation, feature generation, model selection, model deployment) may have various performance metric requirements in order to advance to the next stage. For example, if the original data cannot be satisfactorily mapped (e.g., based on threshold conditions), the machine learning framework system 102 may determine that the selected prebuilt object is not appropriate, and either select another prebuilt object to test and/or report failure of the prebuilt object.

The data source systems 104 may function to store original data (or, "raw" data) and provide original data to one or more other systems. The data source systems 104 may store different types of original data (e.g., data having different data formats). Data formats may refer to file formats, data types, content formats, schemas, and/or the like. In some embodiments, a schema refers to the organization of data as a map of how a datastore is constructed (e.g., divided into database tables in the example of a relational database). For example, original data may be stored in a tabular format, having rows and columns. Each of the rows and/or columns may have an identifier. In various embodiments, functionality of the data source system 104 may be performed by one or more servers (e.g., a cloud-based server) and/or other computing devices.

In some embodiments, the data source systems 104 may include various database systems, data services (e.g., email services), and/or various platforms that store and/or provide data (e.g., Facebook). Original data may be stored and/or accessed using different data formats and/or APIs. For example, original data may include client data, such as client names or other identifiers, software and/or hardware information of associated devices (e.g., operating systems, type of device, network speeds, available bandwidth, content viewing history), and/or the like, each of which may be stored by the same and/or different data source system 104.

The client systems 106 may function to execute a deployed machine learning application. In various embodiments, functionality of the client systems 106 may be performed by one or more servers (e.g., a cloud-based server) and/or other computing devices. For example, the machine learning application may comprise a recommendation system for recommending pipeline path executions in a software deployment pipeline.

The communications network 108 may represent one or more computer networks (e.g., LAN, WAN, or the like) or other transmission mediums. The communication network 108 may provide communication between some or all of the systems, engines, datastores, and/or other features described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

Figure 2:
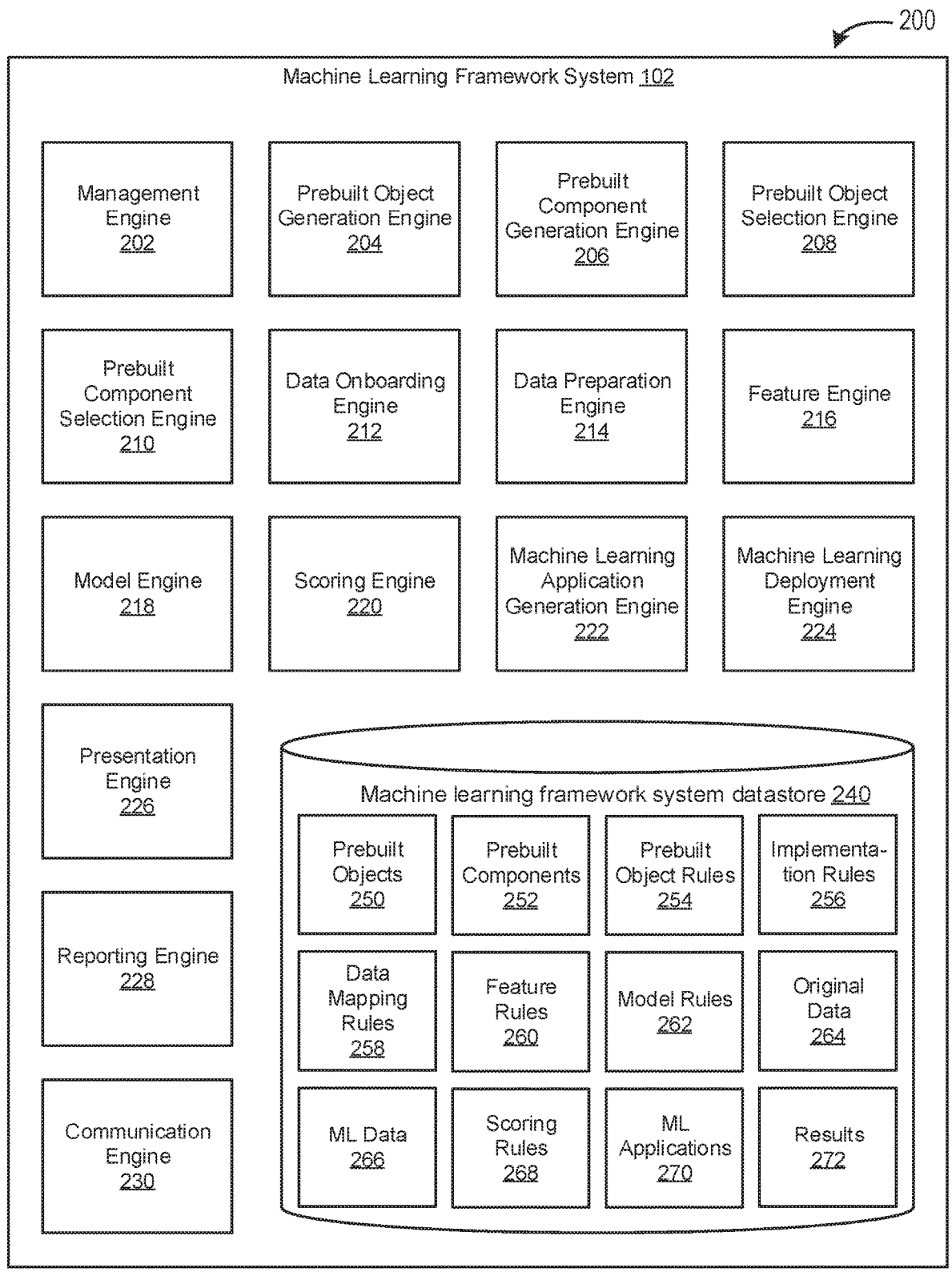
FIG. 2 depicts a diagram of an example machine learning framework system according to some embodiments.

FIG. 2 depicts a diagram 200 of an example machine learning framework system 102 according to some embodiments. In the example of FIG. 2, the machine learning framework system 102 includes a management engine 202, a prebuilt object generation engine 204, a prebuilt component generation engine 206, a prebuilt object selection engine 208, a prebuilt component selection engine 210, a data onboarding engine 212, a data preparation engine 214, a feature engine 216, a model engine 218, a scoring engine 220, a machine learning application generation engine 222, a machine learning deployment engine 224, a presentation engine 226, a reporting engine 228, a communication engine 230, and a machine learning framework system datastore 240.

The management engine 202 may function to manage (e.g., create, read, update, delete, or otherwise access) prebuilt objects 250, prebuilt components 252, prebuilt object rules 254, implementation rules 256, data mapping rules 258, feature rules 260, model rules 262, original data 264, machine learning data 266, scoring rules 268, machine learning applications 270, and results 272. Any of 250-272 may be stored in the machine learning framework system datastore 240 and/or other datastore(s) associated with the machine learning framework system 102. The management engine 202 may perform any of these operations manually (e.g., by a user interacting with a GUI) and/or automatically (e.g., triggered by one or more of the engines 204-230). Like other engines described herein, some or all of the functionality of the management engine 202 may be included in and/or cooperate with one or more other engines (e.g., engines 204-230).

The prebuilt object generation engine 204 may function to create, read, update, and/or delete prebuilt objects 250. A prebuilt object 250 may define prebuilt components 252 and prebuilt object rules 254 for generating a particular type of machine learning application. The prebuilt object rules 254 may define implementation rules 256 for generating a machine learning application 270 for a particular platform, data mapping rules 258 for mapping original data 264 to tables and/or columns defined in the prebuilt object rules 254, feature rules 260 for generating a feature matrix from machine learning data 266 (e.g., data transformed from mapped original data 264), model rules 262 identifying a set of available models and/or selecting a particular available model, and scoring rules 268 for scoring a particular model and/or machine learning application 270.

The prebuilt component generation engine 206 may function to create, read, update, and/or delete prebuilt components 252. A prebuilt component 252 may comprise a coarsely-defined set of functions, attributes, parameters, and/or rules, for performing a respective machine learning service (e.g., data onboarding service, data preparation service, feature generation service, modeling service, and/or model deployment service). Accordingly, the prebuilt components 252 may include data onboarding prebuilt components, data preparation prebuilt components (e.g., implementing an ETL process), feature generation prebuilt components, modelling prebuilt components, model deployment prebuilt components, and/or the like.

The prebuilt object selection engine 208 may function to select one or more prebuilt objects 250 for generating a machine learning application 270. The prebuilt object selection engine 208 may select prebuilt objects 250 based on prebuilt object rules 254. For example, the prebuilt object rules 254 may specify a particular type of problem to be solved (e.g., for matching against a user-specified context), particular data mapping requirements (e.g., for matching against original data 264), available models (e.g., for matching against user-specified context), and/or the like. The prebuilt object selection engine 208 may perform selections either manually and/or automatically (e.g., without requiring user input). For example, the prebuilt object selection engine 208 may match original data 264 against the particular mapping requirements, analyze content of original data 264 to determine appropriate machine learning solutions, and/or the like.

The prebuilt component selection engine 210 may function to select prebuilt components 252 and/or sets of prebuilt components 252. For example, particular sets of prebuilt components may be more suitable for a particular platform than other prebuilt components 252. Accordingly, the prebuilt component selection engine 210 may select prebuilt components based on implementation rules 256 which may define which prebuilt components are suitable for a particular machine learning service and platform.

The data onboarding engine 212 may function to onboard original data 264. This may include mapping the original data 264 to tables and/or column requirements defined by a prebuilt object 250. For example, the data onboarding engine 212 may perform a direct match. However, if the tables and/or columns do not have the exact same fields, this may not be successful. If a direct match fails, the data onboarding engine 212 may utilize data mapping rules 258 to map the original data 264. For example, the data mapping rules 258 may include a look-up table of corresponding (e.g., related and/or synonymous) table and/or column identifiers. For example a "dep" column name in the original data 264 may successfully be mapped to a required "deployment" column name based on the look-up table. In some embodiments, functionality of the data onboarding engine 212 may be at least partially provided by one or more prebuilt components 252.

The data preparation engine 214 may function to prepare original data 264 for a machine learning process. The data preparation engine 214 may, for example, transform and/or filter data, to provide machine learning data 266. The data preparation engine 214 may implement an extract, transform, load (ETL) process. In some embodiments, the data preparation engine 214 may provide training data and testing data from the machine learning data 266 and/or original data 264. For example, the training data may be used to train a model, and the testing data may be used to test or validate a model. In some embodiments, functionality of the data preparation engine 214 may be at least partially provided by one or more prebuilt components 252 (e.g., based on the data mapping rules 258).

The feature engine 216 may function to generate a feature matrix from the machine learning data 266. The feature matrix may be used as input for one or more machine learning models. In some embodiments, the feature engine 216 generates features according the feature rules 260. The feature rules 260 may define a limited set of machine learning data 266 to use to generate the features. This may allow, for example, the feature engine 216 to efficiently determine features without performing unnecessary computations on all of the data. In some embodiments, functionality of the feature engine 216 may be at least partially provided by one or more prebuilt components 252 (e.g., based on the feature rules 260).

The model engine 218 may function to select a machine learning model. In some embodiments, the model engine 218 selects a machine learning model for a set of available models defined by a prebuilt object 250 (e.g., defined in the prebuilt objects rules 254). Available models may include random forest, neural network, and/or the like. The model engine 218 may also function to score models to determine their viability for deployment to a client system (e.g., determine whether it satisfies performance requirements). For example, the model engine 218 may score models based on scoring rules 268. In some embodiments, functionality of the model engine 218 may be at least partially provided by one or more prebuilt components 252 (e.g., based on the model rules 262).

The scoring engine 220 may function to score and/or otherwise evaluate models and/or other features associated with the machine learning services described herein. In some embodiments, the scoring engine 220 may score based on scoring rules 268. For example, the scoring engine 220 may score a model to determine whether it is suitable for deployment to a client system. In another example, the scoring engine 220 may score a deployed model (e.g., in real-time) to determine whether the model needs to be updated. In some embodiments, the scoring engine 220 may score prebuilt objects 250 and/or prebuilt components 252. For example, the scoring engine 220 may score a prebuilt object 250 based on a comparison of the defined requirements of a prebuilt object 250 and original data 264 to be onboarded and/or a user-specified context. Based on the scores, the machine learning framework system 102 may select a set of candidate prebuilt objects 250, and the machine learning framework system 102 may test each prebuilt object 250 to determine which provides the best result (e.g., the machine learning application with the most suitable model). The scoring engine 220 may also similarly score prebuilt components 252 to determine a set of candidate prebuilt components 252, and the machine learning framework system 102 may test the candidate prebuilt components 252 to determine which provides the best result (e.g., the machine learning application with the most suitable model). In some embodiments, functionality of the scoring engine 220 may be at least partially provided by one or more prebuilt components 252 (e.g., based on the scoring rules 268).

The scoring engine 220 may function to calculate a set of scores and select a particular score from the set of scores. For example, the scoring engine 220 may calculate a score for each data input combination for creating a feature matrix, model fitting, model tuning, and/or the like. The selected score may indicate a data input combination that best fits a desired performance (e.g., as indicated by one or more rules). For example, the scoring engine 220 may determine a score for a data input combination, and then compare that score against a predetermined threshold value and/or condition associated with a desired performance. If the score satisfies the condition, the scoring engine 220 may select the data input combination and/or that score as the selected data input combination and/or the selected score. The scoring engine 220 may stop calculating scores for remaining data input combinations once a satisfactory score is determined, and/or the scoring engine 220 may continue to score the remaining data input combinations. For example, the scoring engine 220 may generate a set of satisfactory scores and select the best satisfactory score (e.g., the satisfactory score most closely fitting the predetermined threshold value and/or other predetermined value and/or condition). If no satisfactory scores are determined, the scoring engine 220 may indicate no satisfactory scores and/or trigger the reporting engine 228 to generate a report indicating the results (e.g., so that an engineer may adjust data input combinations, threshold values, and/or the like).

The scoring engine 220 may comprise an evaluation function returning a number from 0.0 to 1.0, 0.0 indicating whether there is a good match, to evaluate a set of candidate solutions based on the matching of its input data element to estimate which one is more likely to be the final match. For example, 0.0 may indicate a good match.

In some embodiments, the scoring engine 220 functions to score table and/or column matches. In one example implementation, for matching columns (e.g., dimensions or features), the indices of the matched rule may indicate a value (0, 0, 1, 0, 0, 1).

For example:

```
synonyms = map(
        "acct" -> List("account", "acct", "acc", "acc*"),
            // account->0, acct->1, acc->2, acc*->3 (low number
            means better)
        "prod" -> List("product", "prod", "prd", "prod*"),
            // product->0, prod->1, prd->2, prod*->3
        "asset" -> List("asset", "ass*"),
            // asset->0, ass*->1
        "acct_id" -> List("id", "ident"),
            // id->0, ident->1
        "prod_id" -> List("id", "ident"),
            // id->0, ident->1
        "prod_price" -> List("price", "base", "base_price")
            // price->0, base->1, base_price->2
            // DataProperty table
DataProperty = map(
    "acct_id" -> "unique [numeric | text]",
    "prod_id" -> "unique [numeric | text]",
    "prod_price" -> "numeric"
)
```

From these tables and columns, ("account product assets account_id product_id product_base"), matches (0, 0, 1, 0, 0, 1), the biggest possible match is 3+3+1+1+1+2=11

In other words, for each matching column (e.g., "account product assets account_id product_id product_base"), their indices of the matched rule may indicate a value (0, 0, 1, 0, 0, 1). For every column name, the scoring engine 220 may prefix it with table name and "_" so that it can signify account_id as "id" column for "account" table specified in the beginning. Similar product_id and product_base refer to "id" and "base" to "product" table. The maximum index of each rules may be (3, 3, 1, 1, 1, 2). Accordingly, the score for this matching may be 2/11. In some embodiments, the score should be in a range from 0 to 1. A lower score may indicate a better match. The scoring may also be estimated by a prediction function formulated as a machine learning problem. The scoring may help reduce a number of computations that need to be performed by limiting a set of available candidate solutions.

The machine learning application generation engine 222 may function to generate an executable machine learning application 270 from a trained and tested model. For example, the machine learning application generation engine 222 may generate the executable machine learning application 270 based on implementation rules 256. For example, in some embodiments, the input for the machine learning application generation engine 222 may be platform independent, and the machine learning application generation engine 222 may generate an executable machine learning application 270 for a particular platform and/or set of platforms.

The machine learning deployment engine 224 may function to deploy a machine learning application 270 to a client system. The machine learning deployment engine 224 may automatically and/or manually deploy a machine learning application. For example, the machine learning deployment engine 224 may automatically deploy a machine learning application 270 in response to satisfying performance requirements (e.g., model performance requirements). This may allow, for example, the machine learning deployment engine 224 to rapidly deploy and/or update a machine learning application 270.

In some embodiments, the machine learning deployment engine 224 functions to deploy capabilities for creating, reading, updating, and/or deleting machine learning applications (e.g., a machine learning application 270). For example, the machine learning deployment engine 224 may deploy some or all of the functionality of the machine learning framework system 102 (e.g., to a client system). The deployed system may include prebuilt objects (e.g., prebuilt objects 250), prebuilt components (e.g., prebuilt components 252), prebuilt object rules (e.g., prebuilt object rules 254), engines (e.g., engines 202-230), and/or the like, which may be used to create a particular machine learning application and/or a pipeline for creating a machine learning application. For example, while the machine learning framework system 102 may function to create machine learning applications for many different types of machine learning problems, a deployed system may function to create different machine learning applications for a subset of the different types of machine learning problems.

The deployed system may, for example, allow client systems to create new machine learning applications (e.g., within one or more constraints defined by the machine learning framework system 102), update existing machine learning applications, and/or the like, without having to communicate with the machine learning framework system 102. For example, a constraint may indicate that the deployed system is limited to source code deployment problem(s) and/or source code deployment machine learning applications.

A source code deployment machine learning application may be or include any number of applications configured to create, train, and deploy machine learning applications. In other words, in some embodiments, systems and methods discussed herein may: (1) create and deploy machine learning models; and/or (2) create and deploy systems and processes for creating new machine learning models. In the latter case, it will be appreciated that a third party may receive and utilize systems for creating new machine learning models based on changing data and changing problems while leveraging their industry expertise.

Accordingly, the deployed system may include prebuilt objects, prebuilt components, and/or the like, for creating source code deployment machine learning applications, but not include other prebuilt objects, other prebuilt components, and/or the like, for other types of machine learning problems and/or machine learning applications.

The presentation engine 226 may function to generate interfaces (e.g., graphical user interfaces) for receiving and providing data. In some embodiments, the presentation engine 226 may generate interfaces for interacting with one or more the of the engines 204-224 and 228. For example, the presentation engine 226 may generate interfaces for receiving a user-specified context, receiving original data 264, defining rules 254-262, generating prebuilt objects 250 and/or prebuilt components 252, and/or the like.

The reporting engine 228 may function to provide results 272 and/or other information. Results 272 may include score results and/or associated reports. For example, a report may be generated and provided upon failed and/or successful deployment of a machine learning application 270. Similarly, results may include successful and/or failed data mappings, data preparation, feature generation, and/or model selection.

The communication engine 230 may function to send requests, transmit and, receive communications, and/or otherwise provide communication with one or a plurality of the systems, engines, and/or datastores described herein. In some embodiments, the communication engine 230 functions to encrypt and decrypt communications. The communication engine 230 may function to send requests to and receive data from one or more systems through a network or a portion of a network. Depending upon implementation-specific considerations, the communication engine 230 may send requests and receive data through a connection, all or a portion of which may be a wireless connection. The communication engine 230 may request and receive messages, and/or other communications from associated systems and/or engines. Communications may be stored in the machine learning framework system datastore 240

Figure 3:
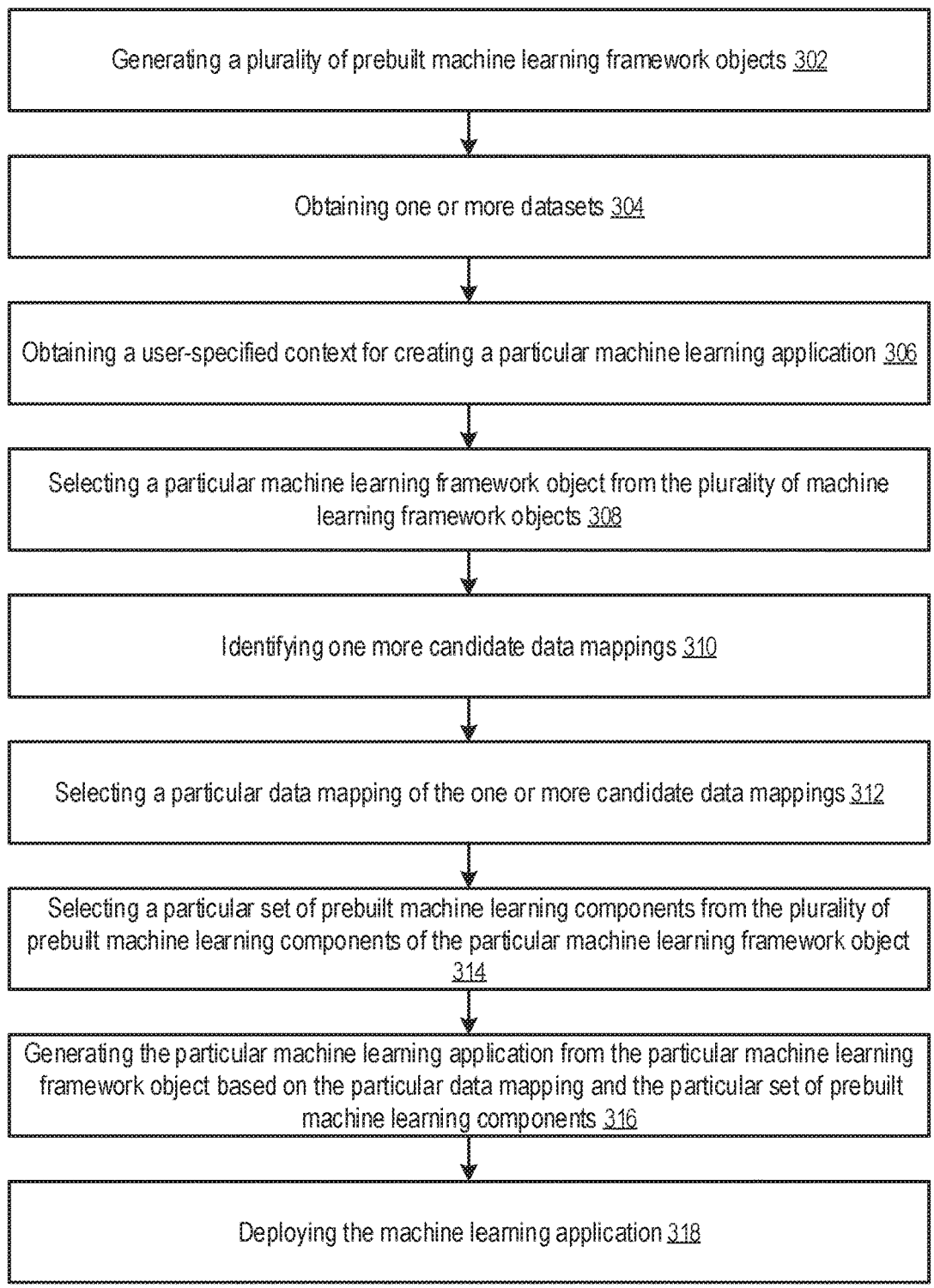
FIG. 3 depicts a flowchart of an example of a method of generating a machine learning application according to some embodiments.

FIG. 3 depicts a flowchart 300 of an example of a method of generating a machine learning application according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 302, a machine learning framework system (e.g., machine learning framework system 102) generates a plurality of prebuilt machine learning framework objects (e.g., prebuilt machine learning framework objects 250). Each of the prebuilt machine learning framework objects may include a plurality of sets of prebuilt machine learning components (e.g., prebuilt machine learning components 252) and one or more data mapping requirements. For example, the data mapping requirements may specify required input data types, tables, columns, and/or the like. In some embodiments, the prebuilt object does not define the particular data inputs (e.g., inputs for the prebuilt components, inputs for the models). This may allow the prebuilt object to be more flexible and be used to create a variety of different machine learning applications.

In some embodiments, each set of prebuilt machine learning components may be associated with a respective machine learning service (e.g., a data onboarding service, a data preparation service, a feature generation service, a modelling service, and a model deployment service). In some embodiments, a prebuilt object generation engine (e.g., prebuilt object generation engine 204) generates the prebuilt machine learning framework objects based on one or more prebuilt object rules (e.g., prebuilt object rules 254). In some embodiments, a prebuilt component generation engine (e.g., prebuilt component generation engine 206) generates the prebuilt machine learning components. In some embodiments, a prebuilt component selection engine (e.g., prebuilt component selection engine 210) selects available components for each of the plurality of prebuilt machine learning framework objects.

In step 304, the machine learning framework system obtains one or more datasets (e.g., original data 264). In some embodiments, a data onboarding engine (e.g., data onboarding engine 212) and/or a communication engine (e.g., communication engine 230) may obtain the one or more datasets from one or more data source systems (e.g., data source systems 104) over a communication network (e.g., communications network 108).

In step 306, the machine learning framework system obtains a user-specified context for creating a particular machine learning application (e.g., machine learning application 270). In some embodiments, a presentation engine (e.g., presentation engine 226) may generate and/or provide one or more GUIs to receive the user-specified context from a client system (e.g., client system 106) over the communications network. In some embodiments, the presentation engine may cooperate with the communication engine to provide such interfaces.

In step 308, the machine learning framework system selects a particular prebuilt machine learning framework object from the plurality of machine learning framework objects based on the one or more datasets and the user-specified context for creating the particular machine learning application. In some embodiments, a prebuilt object selection engine (e.g., prebuilt object selection engine 208) selects the particular prebuilt machine learning framework object.

In some embodiments, the machine learning framework system selects a plurality of candidate machine learning framework objects (or, simply, "candidate objects") from the plurality of machine learning framework objects, and then selects the particular prebuilt machine learning framework object from the candidate objects. For example, the machine learning framework system may select the candidate objects based on the one or more datasets and/or the user-specified context for creating the particular machine learning application. The machine learning framework system may validate one of the candidate machine learning framework objects, and the validated particular prebuilt machine learning framework object may be the particular prebuilt machine learning framework object used to generate the machine learning application.

In some embodiments, the machine learning framework system may validate the candidate object by instantiating at least one prebuilt machine learning component of the particular prebuilt machine learning framework object of the plurality of candidate machine learning framework objects. The machine learning framework system may execute the instance of the least one prebuilt machine learning component of the particular prebuilt machine learning framework object of the plurality of candidate machine learning framework objects. The machine learning framework system may compare one or more results of the executing the instance of the least one prebuilt machine learning component of the particular prebuilt machine learning framework object of the plurality of candidate machine learning framework objects against one or more threshold conditions. The machine learning framework system may determine, based on the comparing, whether the particular prebuilt machine learning framework object of the plurality of candidate machine learning framework objects is valid.

In step 310, the machine learning framework system identifies one more candidate data mappings based on the data mapping requirements of the particular prebuilt machine learning framework object and the one or more datasets. In some embodiments, the data onboarding engine identifies the one or more candidate data mappings based on data mapping requirements defined in the prebuilt objects rules associated with the particular prebuilt machine learning framework object and one or more data mapping rules (e.g., data mapping rules 258).

In step 312, the machine learning framework system selects a particular data mapping of the one or more candidate data mappings. In some embodiments, the data onboarding engine selects the particular data mapping based on the data mapping rules.

In some embodiments, at least a portion of the one or more datasets may comprise tabular data. Tabular data may include at least one table comprising a plurality of rows and a plurality of columns. Selecting the particular data mapping of the one or more candidate data mappings may include mapping, for each of the candidate mappings, the at least one table to a particular table of a respective candidate mapping of the plurality of candidate mappings, and/or mapping, for each of the candidate mappings, at least two columns of the plurality of columns of the table to two or more particular columns of the one or more datasets. A respective score may be determined for each of the respective candidate mappings (e.g., based on how many tables and/or columns are successfully mapped), and the selecting may be based on the respective scores. For example, the respective candidate mapping having the "best" score (e.g., highest score, and/or score most closely matching a desired score) may be selected.

In step 314, the machine learning framework system selects a particular set of prebuilt machine learning components from the plurality of sets of prebuilt machine learning components of the particular prebuilt machine learning framework object. In some embodiments, the prebuilt component selection engine selects the particular set of prebuilt machine learning components (e.g., based on user-specified-context, the one more datasets, data mapping rules, prebuilt object rules, implementation rules).

In some embodiments, the machine learning framework system selects at least two sets of prebuilt machine learning components from the plurality of sets of prebuilt machine learning components based on one or more implementation rules (e.g., implementation rules 256). The implementation rules may indicate a particular platform associated with a system (e.g., client system 106) to execute the machine learning application. The machine learning framework system 102 may score each of the at least two sets of prebuilt machine learning components, and select the particular set of prebuilt machine learning components based on the scoring. For example, the set of prebuilt components having the "best" score (e.g., highest score, and/or score most closely matching a desired score) may be selected.

In step 316, the machine learning framework system generates the particular machine learning application from the particular prebuilt machine learning framework object based on the particular data mapping and the particular set of prebuilt machine learning components. The particular machine learning application may comprise an executable application. In some embodiments, a machine learning application generation engine (e.g., machine learning application generation engine 222) generates the particular machine learning application.

In step 318, the machine learning framework system deploys the particular machine learning application. In some embodiments, a machine learning deployment engine (e.g., machine learning deployment engine 224) deploys the particular machine learning application. For example, the machine learning deployment engine may deploy the particular machine learning application to a client system over the communications network.

Figure 4:
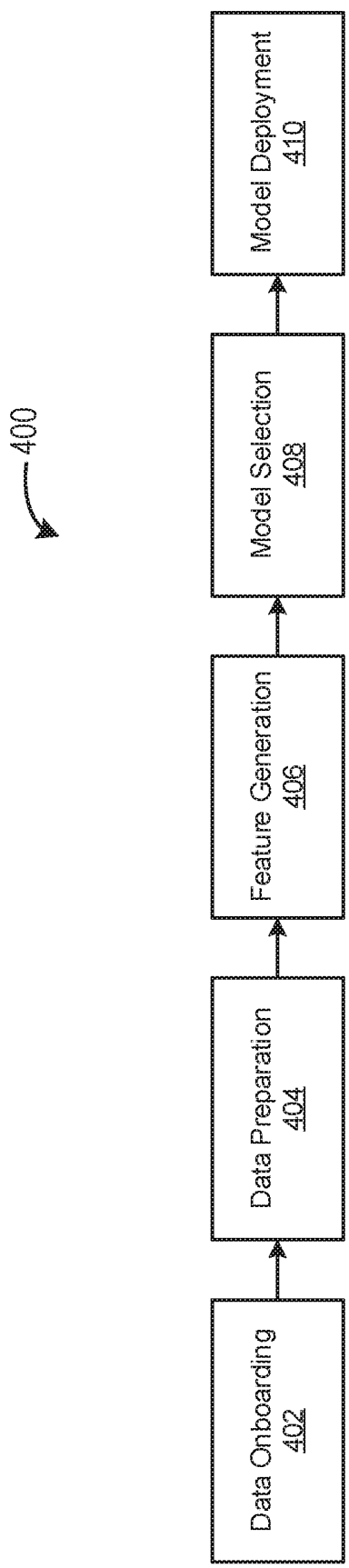
FIG. 4 depicts a diagram of an example of a machine learning process for generating a machine learning application according to some embodiments.

FIG. 4 depicts a diagram 400 of an example of a machine learning process for generating a machine learning application according to some embodiments. Some or all of these steps may be implemented using a prebuilt object (e.g., prebuilt object 250) and prebuilt components (e.g., prebuilt components 252) to rapidly and efficiently generate a machine learning application that may otherwise take months or years to generate under traditional approaches.

In step 402, a machine learning framework system (e.g., machine learning framework system 102) onboards original data (e.g., original data 264). In some embodiments, a data onboarding engine (e.g., data onboarding engine 212) onboards the original data based on requirements defined in a prebuilt object (e.g., prebuilt object 250).

In some embodiments, data onboarding is a one-time process to customize original data on to the prebuilt object. Data structures may different for different sets of original data (e.g., from different data source systems). Typically, data onboarding is performed by a skilled professional (e.g., a machine learning engineer), however the prebuilt objects and/or prebuilt components may allow this step to either be fully performed by the machine learning framework system and/or performed by a lower skilled user. In some embodiments, this step may also include additional data processing (e.g. data encryption or storage access definition).

In step 404, the machine learning framework system prepares the onboarded data. For example, an ETL process may be performed on some or all of the onboarded data. In some embodiments, data preparation, as discussed elsewhere herein, may be ETL and/or other data preparation process. In some embodiments, a data preparation engine (e.g., data preparation engine 214) prepares the data based on requirements of the prebuilt object, thereby transforming the original data 264 to machine learning data 266.

In some embodiments, ETL is a process to download and/or upload data into a single data location so that more elaborated processing can be done. ETL may involve data joins, data filtering, and/or data conversion. These steps usually may be expressed using script (e.g., SQL).

In step 406, the machine learning framework system generates one or more features based on some or all of the prepared data. For example, prebuilt object rules may define which portions of the prepared to use to generate features. Generated features may be used as machine learning model inputs. In some embodiments, a feature generation engine (e.g., feature engine 216) generates the features based on requirements of the prebuilt object.

In some embodiments, feature generation comprises specific data processing for the downstream machine learning processing. For example, based on the transformed data after ETL step, the data may be enhanced for further data transformation according to them machine learning algorithm. The machine learning framework system may encode the data of different data types into a numerical matrix. Some of the encoding may be bucketing, normalization and/or the like.

In step 408, the machine learning framework system selects a model which takes some or all of the generated features as inputs. In some embodiments, a model engine (e.g., model engine 218) selects the model for a set of available models indicated in the prebuilt object.

In some embodiments, the machine learning framework system starts the machine learning modeling once the data is encoded in form of a numerical matrix. According to the prebuilt object, different machine learning algorithms can be applied on the feature matrix. It may be a regression algorithm for prediction systems, classification algorithm for categorization systems, ranking algorithm for recommendation systems, time-series algorithms for forecasting systems, and/or the like. In each type of machine learning algorithm, there may be numerous different algorithms of the same type that may be used (e.g., linear regression can be replaced by random forest regression or deep learning algorithms). However, many or all of these algorithms may not work well with the same feature matrix, and the machine learning framework system may select the algorithm (or, model) with the best fit and/or score.

In some embodiments, model deployment is subject to user-specified context (e.g., performance requirements). For example, some requirements may specify particular real-time model update and response with time limitations (e.g., real-time scoring). Some requirements may only specify particular real-time response with delayed model update (e.g., real-time scoring with precomputation). Some requirements may specify particular response without model update (e.g., offline scoring). Model deployment may be the final step to prove whether such a machine learning application is suitable for providing to the client system.

In step 410, the machine learning framework system deploys the selected model. In some embodiments, the model engine deploys the model. For example, the model engine may deploy the model for testing (e.g., scoring) by a scoring engine (e.g., scoring engine 220) prior to providing the machine learning application including the model to a client system (e.g., client system 106).

Figure 5:
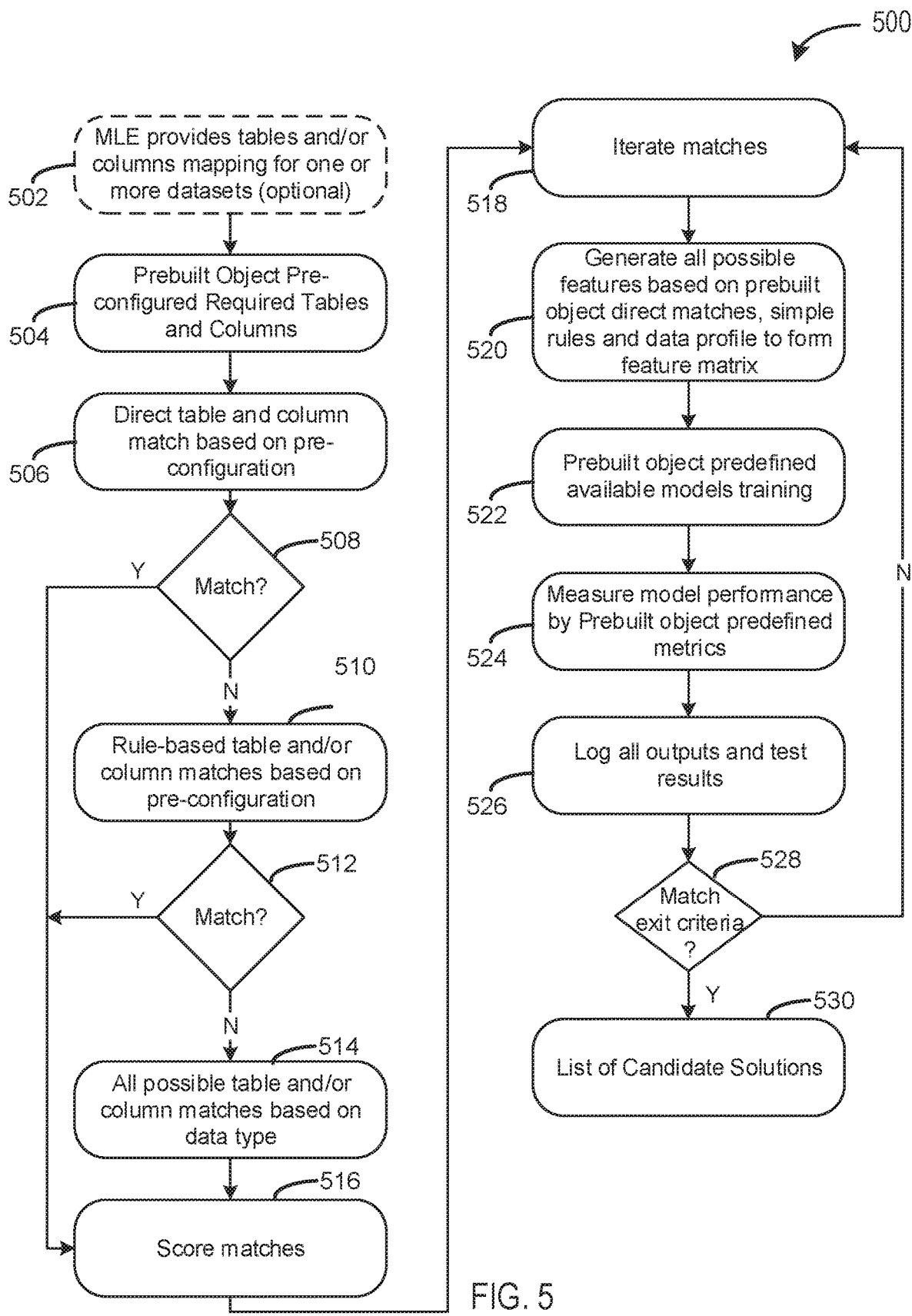
FIG. 5 depicts a flowchart of an example of determining candidate solutions according to some embodiments.

FIG. 5 depicts a flowchart 500 of an example of determining candidate solutions according to some embodiments. As used herein, candidate solutions may refer to particular data mappings (e.g., table and/or column mappings of an onboarded dataset to a predefined table and/or predefined columns of a prebuilt machine learning object), particular models, and/or particular machine learning applications that may be tested (e.g., to determine a particular machine learning application to be deployed to a client system and/or progress through a machine learning process).

In step 502, a machine learning framework system (e.g., machine learning framework system 102) receives table and/or column mappings for one or more datasets (e.g., original data 264). These may be received from a user (e.g., a machine learning engineer). It will be appreciated that this step is optional, and the machine learning framework system may determine mappings without receiving them from a user.

In step 504, the machine learning framework system preconfigures required tables and/or columns based on table and/or column requirements defined by a prebuilt object (e.g., prebuilt object 250). In step 506, the machine learning framework system performs a direct table and/or column match based on the data mappings. The machine learning framework system determines if the match is successful (step 508). If not successful, the machine learning framework system, in step 510, uses data mapping rules of the prebuilt object (e.g., data mapping rules 258). For example, the rules may use a look-up table of corresponding terms (e.g., synonyms) for the table and/or column names. If there is a match here (step 512), or by a successful direct match, then the process continues to step 516. Otherwise, all possible table and/or column matches are determined based on data type (step 514).

In step 516, the machine learning framework system scores the matches. In step 518, the machine learning framework system iterates the matches (steps 520-526) until exit criteria is matched. This may include generating all possible features based on prebuilt object direct matches, simple rules and data profile to form feature matrix (step 520), selecting available models as defined by prebuilt object (step 522), measuring (e.g., scoring) model performance based on prebuilt object predefined metrics (step 524), and logging all outputs and test results (step 526). Once matched (step 528), the machine learning framework system lists the candidate solutions (step 530). Candidate solution may include models meeting performance requirements.

Figure 6:
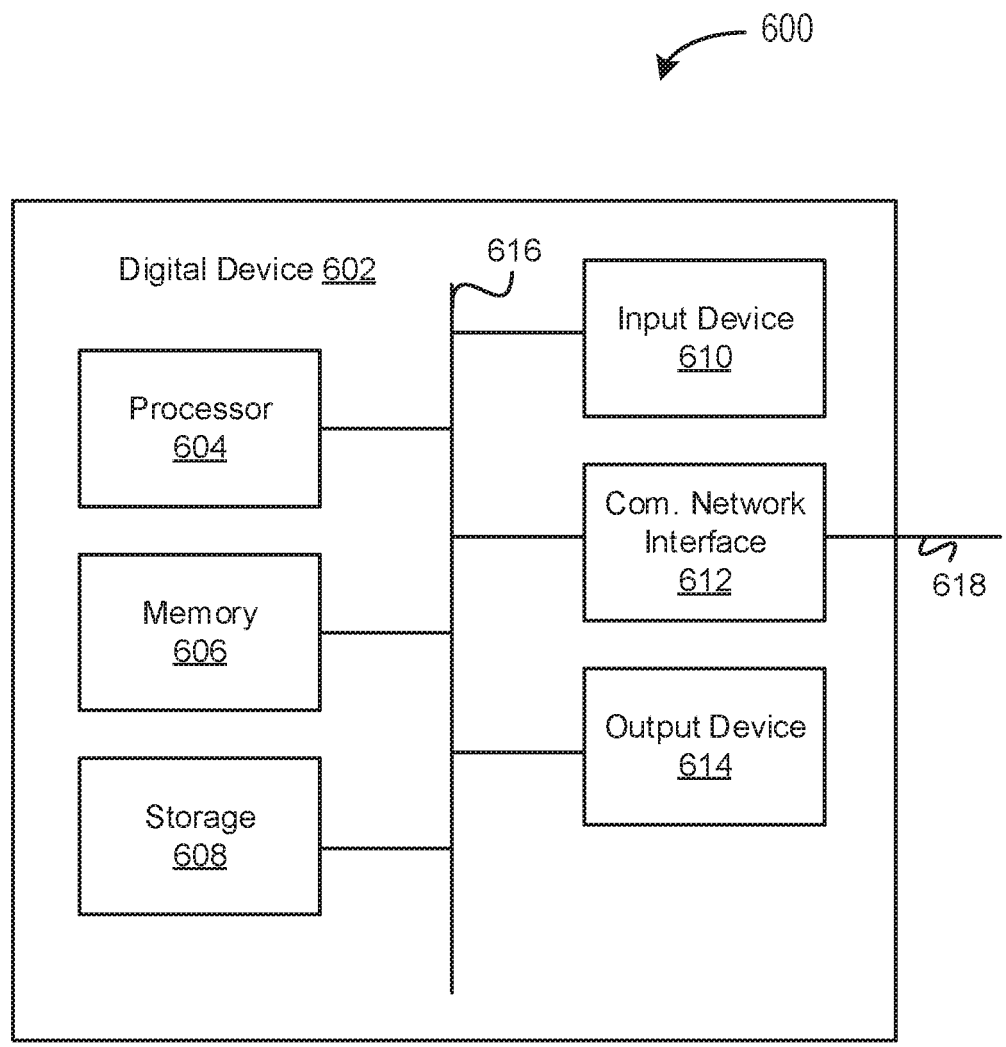
FIG. 6 is a diagram of an example computer system for implementing the features disclosed herein according to some embodiments.

FIG. 6 depicts a diagram 600 of an example of a computing device 602. Any of the systems, engines, datastores, and/or networks described herein may comprise an instance of one or more computing devices 602. In some embodiments, functionality of the computing device 602 is improved to the perform some or all of the functionality described herein. The computing device 602 comprises a processor 604, memory 606, storage 608, an input device 610, a communication network interface 612, and an output device 614 communicatively coupled to a communication channel 616. The processor 604 is configured to execute executable instructions (e.g., programs). In some embodiments, the processor 604 comprises circuitry or any processor capable of processing the executable instructions.

The memory 606 stores data. Some examples of memory 606 include storage devices, such as RAM, ROM, RAM cache, virtual memory, etc. In various embodiments, working data is stored within the memory 606. The data within the memory 606 may be cleared or ultimately transferred to the storage 608.

The storage 608 includes any storage configured to retrieve and store data. Some examples of the storage 608 include flash drives, hard drives, optical drives, cloud storage, and/or magnetic tape. Each of the memory system 606 and the storage system 608 comprises a computer-readable medium, which stores instructions or programs executable by processor 604.

The input device 610 is any device that inputs data (e.g., mouse and keyboard). The output device 614 outputs data (e.g., a speaker or display). It will be appreciated that the storage 608, input device 610, and output device 614 may be optional. For example, the routers/switchers may comprise the processor 604 and memory 606 as well as a device to receive and output data (e.g., the communication network interface 612 and/or the output device 614).

The communication network interface 612 may be coupled to a network (e.g., network 108) via the link 618. The communication network interface 612 may support communication over an Ethernet connection, a serial connection, a parallel connection, and/or an ATA connection. The communication network interface 612 may also support wireless communication (e.g., 802.11 a/b/g/n, WiMax, LTE, WiFi). It will be apparent that the communication network interface 612 may support many wired and wireless standards.

It will be appreciated that the hardware elements of the computing device 602 are not limited to those depicted in FIG. 6. A computing device 602 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 604 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
one or more processors; and
memory storing instructions that, when executed by the one or more processors, cause the computing system to perform:
    generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;
    obtaining one or more datasets, wherein at least a portion of the one or more datasets comprises tabular data, the tabular data including at least one table comprising a plurality of rows and a plurality of columns;
    obtaining a user-specified context for creating a particular machine learning application;
    selecting a particular prebuilt machine learning framework object from the plurality of machine learning framework objects based on the one or more datasets and the user-specified context for creating the particular machine learning application;
    identifying one more candidate data mappings based on the data mapping requirements of the particular prebuilt machine learning framework object and the one or more datasets;
    selecting a particular data mapping of the one or more candidate data mappings which comprises:
        mapping, for each of the candidate mappings, the at least one table to a particular table of a respective candidate mapping of the plurality of candidate mappings;
        mapping, for each of the candidate mappings, at least two columns of the plurality of columns of the table to two or more particular columns of the one or more datasets;
        determining a respective score for each of the respective candidate mappings; and
        selecting the particular data mapping of the one or more candidate data mappings based on the respective scores;
    selecting a particular set of prebuilt machine learning components from the plurality of sets of prebuilt machine learning components of the particular prebuilt machine learning framework object which comprises:
        selecting at least two sets of prebuilt machine learning components from the plurality of sets of prebuilt machine learning components based on one or more implementation rules, the implementation rules indicating a particular platform associated with a system to execute the machine learning application;
        scoring each of the at least two sets of prebuilt machine learning components; and
        selecting the particular set of prebuilt machine learning components based on the scoring;
    generating the particular machine learning application from the particular prebuilt machine learning framework object based on the particular data mapping and the particular set of prebuilt machine learning components, the particular machine learning application comprising an executable application; and
    deploying the machine learning application.

2. The system of claim 1, wherein the respective machine learning services include two or more of a data onboarding service, a data preparation service, a feature service, a model selection service, and a model deployment service.

3. The system of claim 1, wherein the instructions further cause the system to perform:
    selecting a plurality candidate machine learning framework objects from the plurality of machine learning framework objects based on the one or more datasets and the user-specified context for creating the particular machine learning application; and
    validating a particular prebuilt machine learning framework object of the plurality of candidate machine learning framework objects, the validated particular prebuilt machine learning framework object comprising the particular prebuilt machine learning framework object from the plurality of machine learning framework objects.

4. The system of claim 3, wherein the validating further comprises:
    instantiating at least one prebuilt machine learning component of the particular prebuilt machine learning framework object of the plurality of candidate machine learning framework objects;
    executing an instance of the least one prebuilt machine learning component of the particular prebuilt machine learning framework object of the plurality of candidate machine learning framework objects;
    comparing one or more results of the executing the instance of the least one prebuilt machine learning component of the particular prebuilt machine learning framework object of the plurality of candidate machine learning framework objects against one or more threshold conditions; and
    determining, based on the comparing, the particular prebuilt machine learning framework object of the plurality of candidate machine learning framework objects is valid.

5. The system of claim 1, wherein the machine learning framework object is platform independent.

6. A method being implemented by a computing system including one or more physical processors and storage media storing machine-readable instructions, the method comprising:

generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;

obtaining one or more datasets, wherein at least a portion of the one or more datasets comprises tabular data, the tabular data including at least one table comprising a plurality of rows and a plurality of columns;

obtaining a user-specified context for creating a particular machine learning application;

selecting a particular prebuilt machine learning framework object from the plurality of machine learning framework objects based on the one or more datasets and the user-specified context for creating the particular machine learning application;

identifying one more candidate data mappings based on the data mapping requirements of the particular prebuilt machine learning framework object and the one or more datasets;

selecting a particular data mapping of the one or more candidate data mappings which comprises:
mapping, for each of the candidate mappings, the at least one table to a particular table of a respective candidate mapping of the plurality of candidate mappings;
mapping, for each of the candidate mappings, at least two columns of the plurality of columns of the table to two or more particular columns of the one or more datasets;
determining a respective score for each of the respective candidate mappings; and
selecting the particular data mapping of the one or more candidate data mappings based on the respective scores;

selecting a particular set of prebuilt machine learning components from the plurality of sets of prebuilt machine learning components of the particular prebuilt machine learning framework object which comprises:
selecting at least two sets of prebuilt machine learning components from the plurality of sets of prebuilt machine learning components based on one or more implementation rules, the implementation rules indicating a particular platform associated with a system to execute the machine learning application; and
scoring each of the at least two sets of prebuilt machine learning components;

selecting the particular set of prebuilt machine learning components based on the scoring;

generating the particular machine learning application from the particular prebuilt machine learning framework object based on the particular data mapping and the particular set of prebuilt machine learning components, the particular machine learning application comprising an executable application; and deploying the machine learning application.

7. The method of claim 6, wherein the respective machine learning services include two or more of a data onboarding service, a data preparation service, a feature service, a model selection service, and a model deployment service.

8. The method of claim 6, further comprising:
selecting a plurality candidate machine learning framework objects from the plurality of machine learning framework objects based on the one or more datasets and the user-specified context for creating the particular machine learning application; and
validating a particular prebuilt machine learning framework object of the plurality of candidate machine learning framework objects, the validated particular prebuilt machine learning framework object comprising the particular prebuilt machine learning framework object from the plurality of machine learning framework objects.

9. The method of claim 8, wherein the validating further comprises:
instantiating at least one prebuilt machine learning component of the particular prebuilt machine learning framework object of the plurality of candidate machine learning framework objects;
executing the instance of the least one prebuilt machine learning component of the particular prebuilt machine learning framework object of the plurality of candidate machine learning framework objects;
comparing one or more results of the executing the instance of the least one prebuilt machine learning component of the particular prebuilt machine learning framework object of the plurality of candidate machine learning framework objects against one or more threshold conditions; and
determining, based on the comparing, the particular prebuilt machine learning framework object of the plurality of candidate machine learning framework objects is valid.

10. The method of claim 6, wherein the machine learning framework object is platform independent.

11. A non-transitory computer readable medium comprising instructions that, when executed, cause one or more processors to perform:

generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;

obtaining one or more datasets, wherein at least a portion of the one or more datasets comprises tabular data, the tabular data including at least one table comprising a plurality of rows and a plurality of columns;

obtaining a user-specified context for creating a particular machine learning application;

selecting a particular prebuilt machine learning framework object from the plurality of machine learning framework objects based on the one or more datasets and the user-specified context for creating the particular machine learning application;

identifying one more candidate data mappings based on the data mapping requirements of the particular prebuilt machine learning framework object and the one or more datasets;

selecting a particular data mapping of the one or more candidate data mappings which comprises:
mapping, for each of the candidate mappings, the at least one table to a particular table of a respective candidate mapping of the plurality of candidate mappings;

mapping, for each of the candidate mappings, at least two columns of the plurality of columns of the table to two or more particular columns of the one or more datasets;
determining a respective score for each of the respective candidate mappings; and
selecting the particular data mapping of the one or more candidate data mappings based on the respective scores;
selecting a particular set of prebuilt machine learning components from the plurality of sets of prebuilt machine learning components of the particular prebuilt machine learning framework object which comprises:
selecting at least two sets of prebuilt machine learning components from the plurality of sets of prebuilt machine learning components based on one or more implementation rules, the implementation rules indicating a particular platform associated with a system to execute the machine learning application;
scoring each of the at least two sets of prebuilt machine learning components; and
selecting the particular set of prebuilt machine learning components based on the scoring;
generating the particular machine learning application from the particular prebuilt machine learning framework object based on the particular data mapping and the particular set of prebuilt machine learning components, the particular machine learning application comprising an executable application; and
deploying the machine learning application.

12. The non-transitory computer readable medium of claim 11, wherein the respective machine learning services include two or more of a data onboarding service, a data preparation service, a feature service, a model selection service, and a model deployment service.

13. The non-transitory computer readable medium of claim 11, further comprising:
selecting a plurality candidate machine learning framework objects from the plurality of machine learning framework objects based on the one or more datasets and the user-specified context for creating the particular machine learning application; and
validating a particular prebuilt machine learning framework object of the plurality of candidate machine learning framework objects, the validated particular prebuilt machine learning framework object comprising the particular prebuilt machine learning framework object from the plurality of machine learning framework objects.

14. The non-transitory computer readable medium of claim 13, wherein the validating further comprises:
instantiating at least one prebuilt machine learning component of the particular prebuilt machine learning framework object of the plurality of candidate machine learning framework objects;
executing the instance of the least one prebuilt machine learning component of the particular prebuilt machine learning framework object of the plurality of candidate machine learning framework objects;
comparing one or more results of the executing the instance of the least one prebuilt machine learning component of the particular prebuilt machine learning framework object of the plurality of candidate machine learning framework objects against one or more threshold conditions; and
determining, based on the comparing, the particular prebuilt machine learning framework object of the plurality of candidate machine learning framework objects is valid.

15. A computing system comprising:
one or more processors; and
memory storing instructions that, when executed by the one or more processors, cause the computing system to perform:
generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;
obtaining one or more datasets;
obtaining a user-specified context for creating a particular machine learning application;
selecting a particular prebuilt machine learning framework objects from the plurality of machine learning framework objects based on the one or more datasets and the user-specified context for creating the particular machine learning application;
selecting a plurality candidate machine learning framework objects from the plurality of machine learning framework objects based on the one or more datasets and the user-specified context for creating the particular machine learning application;
validating a particular prebuilt machine learning framework object of the plurality of candidate machine learning framework objects, the validated particular prebuilt machine learning framework object comprising the particular prebuilt machine learning framework object from the plurality of machine learning framework objects;
identifying one more candidate data mappings based on the data mapping requirements of the particular prebuilt machine learning framework object and the one or more datasets;
selecting a particular data mapping of the one or more candidate data mappings;
selecting a particular set of prebuilt machine learning components from the plurality of sets of prebuilt machine learning components of the particular prebuilt machine learning framework object;
generating the particular machine learning application from the particular prebuilt machine learning framework object based on the particular data mapping and the particular set of prebuilt machine learning components, the particular machine learning application comprising an executable application; and
deploying the machine learning application.

16. The system of claim 15, wherein the validating further comprises:
instantiating at least one prebuilt machine learning component of the particular prebuilt machine learning framework object of the plurality of candidate machine learning framework objects;
executing the instance of the least one prebuilt machine learning component of the particular prebuilt machine learning framework object of the plurality of candidate machine learning framework objects;
comparing one or more results of the executing the instance of the least one prebuilt machine learning component of the particular prebuilt machine learning framework object of the plurality of candidate machine learning framework objects against one or more threshold conditions; and determining, based on the comparing, the particular prebuilt machine learning framework object of the plurality of candidate machine learning framework objects is valid.

17. The system of claim 15, wherein the respective machine learning services include two or more of a data onboarding service, a data preparation service, a feature service, a model selection service, and a model deployment service.

18. The system of claim 15, wherein at least a portion of the one or more datasets comprises tabular data, the tabular data including at least one table comprising a plurality of rows and a plurality of columns.

19. The system of claim 18, wherein the selecting a particular data mapping of the one or more candidate data mappings further causes the system to perform:
- mapping, for each of the candidate mappings, the at least one table to a particular table of a respective candidate mapping of the plurality of candidate mappings;
- mapping, for each of the candidate mappings, at least two columns of the plurality of columns of the table to two or more particular columns of the one or more datasets;
- determining a respective score for each of the respective candidate mappings; and
- selecting the particular data mapping of the one or more candidate data mappings based on the respective scores.

20. The system of claim 19, wherein the selecting a particular set of prebuilt machine learning components from the plurality of sets of prebuilt machine learning components of the particular prebuilt machine learning framework object further causes the system to perform:
- selecting at least two sets of prebuilt machine learning components from the plurality of sets of prebuilt machine learning components based on one or more implementation rules, the implementation rules indicating a particular platform associated with a system to execute the machine learning application;
- scoring each of the at least two sets of prebuilt machine learning components; and
- selecting the particular set of prebuilt machine learning components based on the scoring.

21. A method being implemented by a computing system including one or more physical processors and storage media storing machine-readable instructions, the method comprising:
- generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;
- obtaining one or more datasets;
- obtaining a user-specified context for creating a particular machine learning application;
- selecting a particular prebuilt machine learning framework object from the plurality of machine learning framework objects based on the one or more datasets and the user-specified context for creating the particular machine learning application;
- selecting a plurality candidate machine learning framework objects from the plurality of machine learning framework objects based on the one or more datasets and the user-specified context for creating the particular machine learning application;
- validating a particular prebuilt machine learning framework object of the plurality of candidate machine learning framework objects, the validated particular prebuilt machine learning framework object comprising the particular prebuilt machine learning framework object from the plurality of machine learning framework objects
- identifying one more candidate data mappings based on the data mapping requirements of the particular prebuilt machine learning framework object and the one or more datasets;
- selecting a particular data mapping of the one or more candidate data mappings;
- selecting a particular set of prebuilt machine learning components from the plurality of sets of prebuilt machine learning components of the particular prebuilt machine learning framework object;
- generating the particular machine learning application from the particular prebuilt machine learning framework object based on the particular data mapping and the particular set of prebuilt machine learning components, the particular machine learning application comprising an executable application; and
- deploying the machine learning application.

22. The method of claim 21, wherein the validating further comprises:
- instantiating at least one prebuilt machine learning component of the particular prebuilt machine learning framework object of the plurality of candidate machine learning framework objects;
- executing the instance of the least one prebuilt machine learning component of the particular prebuilt machine learning framework object of the plurality of candidate machine learning framework objects;
- comparing one or more results of the executing the instance of the least one prebuilt machine learning component of the particular prebuilt machine learning framework object of the plurality of candidate machine learning framework objects against one or more threshold conditions; and
- determining, based on the comparing, the particular prebuilt machine learning framework object of the plurality of candidate machine learning framework objects is valid.

23. The method of claim 21, wherein the respective machine learning services include two or more of a data onboarding service, a data preparation service, a feature service, a model selection service, and a model deployment service.

24. The method of claim 21, wherein at least a portion of the one or more datasets comprises tabular data, the tabular data including at least one table comprising a plurality of rows and a plurality of columns.

25. The method of claim 24, wherein the selecting a particular data mapping of the one or more candidate data mappings comprises:
- mapping, for each of the candidate mappings, the at least one table to a particular table of a respective candidate mapping of the plurality of candidate mappings;
- mapping, for each of the candidate mappings, at least two columns of the plurality of columns of the table to two or more particular columns of the one or more datasets;
- determining a respective score for each of the respective candidate mappings; and selecting the particular data mapping of the one or more candidate data mappings based on the respective scores.

26. A non-transitory computer readable medium comprising instructions that, when executed, cause one or more processors to perform:

generating a plurality of prebuilt machine learning framework objects, each of the prebuilt machine learning framework objects comprising a plurality of sets of prebuilt machine learning components and one or more data mapping requirements, each of the sets of prebuilt machine learning components associated with a respective machine learning service;

obtaining one or more datasets;

obtaining a user-specified context for creating a particular machine learning application;

selecting a particular prebuilt machine learning framework object from the plurality of machine learning framework objects based on the one or more datasets and the user-specified context for creating the particular machine learning application;

selecting a plurality candidate machine learning framework objects from the plurality of machine learning framework objects based on the one or more datasets and the user-specified context for creating the particular machine learning application;

validating a particular prebuilt machine learning framework object of the plurality of candidate machine learning framework objects, the validated particular prebuilt machine learning framework object comprising the particular prebuilt machine learning framework object from the plurality of machine learning framework objects;

identifying one more candidate data mappings based on the data mapping requirements of the particular prebuilt machine learning framework object and the one or more datasets;

selecting a particular data mapping of the one or more candidate data mappings;

selecting a particular set of prebuilt machine learning components from the plurality of sets of prebuilt machine learning components of the particular prebuilt machine learning framework object;

generating the particular machine learning application from the particular prebuilt machine learning framework object based on the particular data mapping and the particular set of prebuilt machine learning components, the particular machine learning application comprising an executable application; and deploying the machine learning application.

27. The non-transitory computer readable medium of claim 26, wherein the validating further comprises:

instantiating at least one prebuilt machine learning component of the particular prebuilt machine learning framework object of the plurality of candidate machine learning framework objects;

executing the instance of the least one prebuilt machine learning component of the particular prebuilt machine learning framework object of the plurality of candidate machine learning framework objects;

comparing one or more results of the executing the instance of the least one prebuilt machine learning component of the particular prebuilt machine learning framework object of the plurality of candidate machine learning framework objects against one or more threshold conditions; and determining, based on the comparing, the particular prebuilt machine learning framework object of the plurality of candidate machine learning framework objects is valid.

28. The non-transitory computer readable medium of claim 26, wherein the respective machine learning services include two or more of a data onboarding service, a data preparation service, a feature service, a model selection service, and a model deployment service.

29. The non-transitory computer readable medium of claim 26, wherein at least a portion of the one or more datasets comprise tabular data, the tabular data including at least one table comprising a plurality of rows and a plurality of columns.

30. The non-transitory computer readable medium of claim 26, wherein the selecting a particular data mapping of the one or more candidate data mappings comprises:

mapping, for each of the candidate mappings, the at least one table to a particular table of a respective candidate mapping of the plurality of candidate mappings;

mapping, for each of the candidate mappings, at least two columns of the plurality of columns of the table to two or more particular columns of the one or more datasets;

determining a respective score for each of the respective candidate mappings; and selecting the particular data mapping of the one or more candidate data mappings based on the respective scores.

* * * * *

UNITED STATES PATENT AND TRADEMARK OFFICE
CERTIFICATE OF CORRECTION

PATENT NO. : 10,789,509 B2  
APPLICATION NO. : 16/218425  
DATED : September 29, 2020  
INVENTOR(S) : Man Chan Page 1 of 1

It is certified that error appears in the above-identified patent and that said Letters Patent is hereby corrected as shown below:

On the Title Page

Item (71):
"Colo de Caza, CA (US)" should read --Coto de Caza, CA (US)--.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*